United States Patent [19]

Partridge

[11] 4,009,430
[45] Feb. 22, 1977

[54] ANTIPARALLEL COMMUTATED INVERTER

[76] Inventor: Donald F. Partridge, 436 Aldo Ave., Santa Clara, Calif. 95050

[22] Filed: Apr. 14, 1975

[21] Appl. No.: 568,040

[52] U.S. Cl. .......................... 321/45 C; 219/10.77
[51] Int. Cl.² ..................................... H02M 7/515
[58] Field of Search ............ 321/45 C; 307/252 M; 219/10.77

[56] References Cited

UNITED STATES PATENTS

| | | | |
|---|---|---|---|
| 3,315,145 | 4/1967 | Menard | 321/45 C |
| 3,349,315 | 10/1967 | Studtmann | 321/45 ER |
| 3,562,611 | 2/1971 | Gurwicz | 321/45 C |
| 3,609,511 | 9/1971 | Risberg | 321/45 ER X |
| 3,713,013 | 1/1973 | Phillips et al. | 321/45 C X |
| R27,193 | 10/1971 | Risberg | 321/45 C X |

FOREIGN PATENTS OR APPLICATIONS 1,613,620 12/1970 Germany ........................ 321/45 C

OTHER PUBLICATIONS

Electronic Industries, Oct., 1964, pp. 38–40.

*Primary Examiner*—William M. Shoop
*Attorney, Agent, or Firm*—Gerald L. Moore

[57] ABSTRACT

A control circuit for regulating power to a resonant load from a dc source including switching devices, magnetic means and antiparallel means for increasing the reverse voltage on the switching devices, reducing the $dv/dt$ stresses on the switching devices, reducing the likelihood of a crowbar or shoot through of the switching devices and obtaining the ability of recovering from a shoot through without device failure or circuit interruption.

21 Claims, 5 Drawing Figures

ANTIPARALLEL COMMUTATED INVERTER

There are several circuits known today for regulating the flow of power to a resonant load. One type which uses a commutation circuit in which current is passed or forced through a diode which is connected in anti-parallel relation with a switching device is disclosed in the SCR Manual, 5th Edition, by General Electric, pages 383 to 387.

Another commonly used circuit that utilizes antiparallel diode commutation has a half bridge circuit driving a series tuned induction heating load. In such a circuit a capacitive voltage divider is connected across the dc source. Also in parallel with the dc source is a pair of series-connected SCR's. Each SCR has a diode connected in anti-parallel relationship across it. A series tuned induction heating load is connected between the capacitive voltage divider center connection and the series connection point of the two SCR's. this circuit is one form of the well-known series commutated inverters and has in parallel with each SCR and RC filter circuit.

In such an induction heating circuit the first SCR is fired, current will then flow from the capacitive voltage divider through that SCR, through the series-tuned load and back to the voltage divider. The current will flow in a sinusoidal manner and then reverses direction. When the current reverses direction, it will flow through the anti-parallel diode associated with the first SCR, so the SCR will be reverse-biased and therefore commutated by the forward drop of the diode. At some time after the first SCR has regained its forward blocking ability, the second SCR is fired and the process is repeated. That is, current will flow through the capacitive voltage divider, the second SCR, the load and back to the voltage divider. The current again will be sinusoidal and then reverse direction. When the current reverses direction, it will flow through the anti-parallel diode and commutate the associated SCR. The reverse voltage across the second SCR will be the forward voltage of the associated diode.

The following three major problems exist with these prior known circuits and with other similar circuits where antiparallel type commutation is used:

1. The reverse voltage across the SCRs is low — in the order of one volt and this required a longer reverse voltage time than would be required with a higher reverse voltage. Alternatively, a more expensive SCR is required to maintain the reverse voltage time at a minimum.

2. When the second, and each subsequent SCR is fired, a very high $dv/dt$ is experienced across the SCR that has just been commutated. This high $dv/dt$ requires a longer reverse voltage time across each SCR after commutation than if a low $dv/dt$ were experienced, or in the alternative more expensive SCRs must be used. At high frequencies the power absorbed in the $dv/dt$ filters is very high.

3. If for some reason both SCRs become conductive at the same time, there is no way to recover and, at best, the circuit must be interrupted to protect the power components. This condition is commonly called a crowbar or shoot through.

It is the overall purpose of this invention to provide an anti-parallel type commutation circuit which affords the control of power from a dc source to a resonant load in a simple, reliable and economical manner.

SUMMARY OF THE INVENTION

It is the primary purpose of this invention to provide an anti-parallel type commutation circuit which avoids the shortcomings of the prior known anti-parallel type circuits by reversing the current in such a manner that the reverse voltage across the switching devices is much larger than the forward drop of a diode while at the same time permitting the use of small $dv/dt$ filters, which are low in power rating, and maintaining the $dv/dt$ across the SCRs low in value. Further, where required, the invention allows for the addition of a low cost auxiliary commutation circuit to be used when the primary commutation means fails (i.e. when a crowbar or shoot through occurs).

One method to accomplish the foregoing is with the addition of one small inexpensive center-tapped inductor placed in series with the two power switching devices and connecting the anti-parallel devices in anti-parallel relationship with the series circuit of the corresponding switching devices and the center-tapped inductor. Further, the small inductor can be used as a current limiting device for an auxiliary commutator.

DESCRIPTION OF THE DRAWINGS

In FIG. 1 is shown a prior art anti-parallel type commutation circuit for regulating current flow and therefor power delivered from a power supply 17A to a load 13A. Such a control circuit is commonly referred to as a series inverter and is used to control power delivered to the series tuned load represented by the series connected inductor 16A, the capacitor 15A and the resistor 14A, such as for example, an induction heating load. The dc power supply is connected across two series connected capacitors 11A and 12A. Also series connected across the power supply are switching devices in the form of the SCRs 18A and 19A. The load 13A is connected between the common terminals of the series connected SCRs and the capacitors. A diode 10A is connected in anti-parallel relationship with the SCR 18A and a diode 10B is connected in anti-parallel relationship with the SCR 19A.

In operation, when the SCR 18A is fired, current will flow from the capacitor 11A through the SCR and the series tuned load 13A back to the voltage divider. The current flows in a sinusoidal manner and then reverses direction. The reverse direction current will flow through the anti-parallel diode 10A and the SCR 18A will be back biased and thereby commutated. At a predetermined time after the SCR 18A has gained a forward blocking ability, the second SCR is fired and the process repeated. By regulating the rapidity of firing the SCRs 18A and 19A, the power delivered to the load 13A is regulated.

However, as stated heretofore, this prior art circuit has certain inherent disadvantages, namely:

1. Because the reverse voltage on the switching SCRs is low, either a longer reverse voltage time or more expensive SCRs must be used to allow the SCRs to permit proper commutation.

2. When one switching SCR is fired, a high $dv/dt$ is experienced across the other switching SCR also requiring a longer reverse voltage time period for proper commutation, or in the alternative, more expensive SCRs can be used.

3. If a crowbar condition or shoot through does occur, the only way to recover control is to interrupt the circuit, otherwise the various components of the circuit may be damaged. Thus one is left with the choice in using the prior art circuit of either employing more expensive switching devices or experiencing longer switching delays for proper control. It is the purpose of the present invention to provide a simple and economical control circuit of the type just described, which circuit does not have the inherent disadvantages just described.

In accordance with the present invention, a small inexpensive center-tapped inductor is connected in series between the two switching devices and the anti-parallel circuits are connected around the series circuit of the associated switching device and the inductor. The advantages of this circuit will be explained hereinafter.

Figure 2:
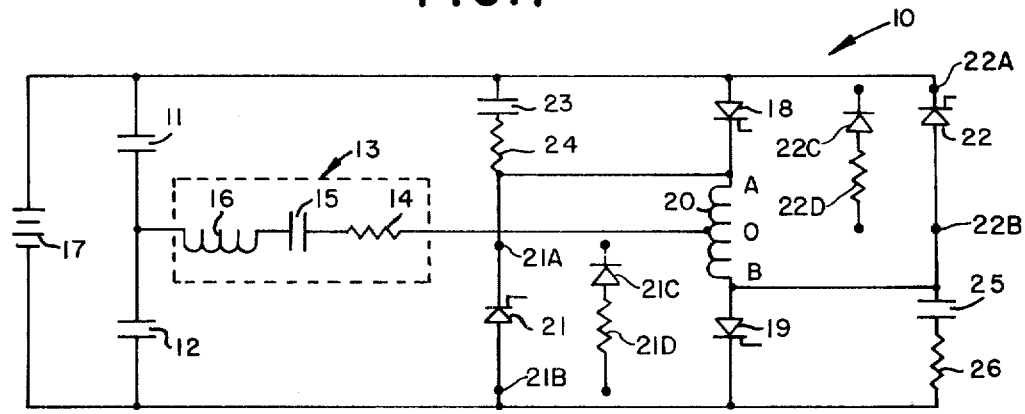
FIG. 2 shows a first embodiment of the invention supplying power to a resonant load.

FIG. 2 illustrates a preferred embodiment of the invention in the form of an inverting circuit 10 made in accordance with the present invention for regulating energy flow from a power supply 17 to a load 13. The load 13 is represented by a series connected inductor 16, capacitor 15 and the resistor 14 such as an induction heating load, but could also be any type of load having series resonant characteristics. The dc power supply 17 is connected across two series connected capacitors 11 and 12. It should be understood that other power sources can be used in place of the dc supply and capacitor combination. For instance either capacitor 11 or 12 can be shorted and the circuit still function, also a full bridge can be used (i.e. the end of load 13 connected to the terminal of the capacitor 11 and capacitor 12 can be connected to the center tap of another inductor similar to the inductor 20 connected in another half bridge like the one shown in FIG. 2). The SCR 18 (SCRs are used by way of example for switching devices but thyratrons, mercury arc tubes and like devices can be used), an inductor 20 and another SCR 19 are series connected in that order and in parallel connection with the circuit including the series connected capacitors 11 and 12. The inductor 20 is center-tapped and the load 13 is connected between that center tap and the connecting terminals or common junction of the capacitors 11 and 12 which form a capacitive voltage divider. An SCR 21 is connected in anti-parallel relationship with the series circuit of SCR 19 and the inductor 20. Similarly connected across the series connected SCR 18 and inductor 20 is the SCR 22 in anti-parallel relation with the SCR 18.

Figure 1:
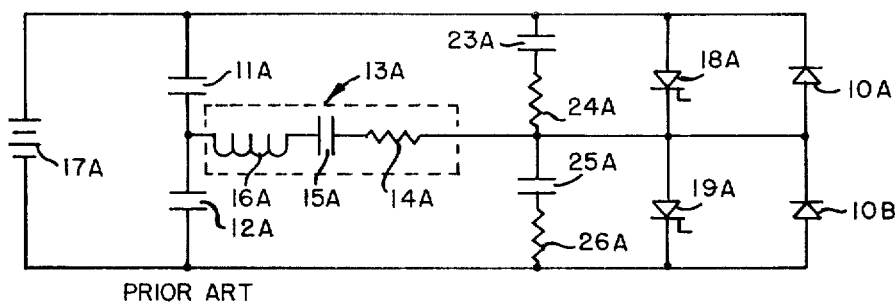
FIG. 1 shows a prior art anti-parallel type commutation circuit with a series resonant load.

An RC filter, including a capacitor 23 and a resistor 24 is series connected and in parallel with the SCR 18. In a like manner an RC filter comprising a capacitor 25 and resistor 26 is in parallel with the SCR 19. Similar filters can be connected across the SCRs 21 and 22 in addition to or in lieu of the filters across the SCRs 18 and 19. The purpose of these RC filters is to keep the $dv/dt$ on the SCRs 18 and 19 low. At a given frequency the energy absorbed in the filter of the present invention is much lower than that of similar filters in the prior art devices of FIG. 1 for the same $dv/dt$ stress.

In operation, the circuit shown in FIG. 2 supplies sinusoidal current at a basic frequency determined by the value of the capacitor 15 and the value of the inductor 16 plus one-fourth of the inductive value of the inductor 20. A cycle of operation of the preferred embodiment in FIG. 2 is as follows: When the SCR 18 is fired current will flow through the capacitor 11, the SCR 18, the AO portion of inductor 20 and the load 13 and back to the capacitor 11. The current will flow in a sinusoidal manner and then reverse direction. When the current reverses direction the SCR 18 is commutated in a manner similar to the prior art described but with a significant improvement to be explained hereinafter.

There are two basic modes of operation of the commutation interval with the modes differing depending on the time the SCR 22 is caused to conduct. One mode is achieved when the SCR 22 is caused to conduct just after the current reverses direction. The second mode is achieved when the SCR 22 is caused to conduct when the SCR 18 starts to support reverse voltage. In either mode, the time interval between the firing of the SCRs 18 and 19 can determine the level of power delivered to the load from a given power source.

In the first mode of operation (when the SCR 22 is caused to conduct just after the current reverses direction) commutation occurs in the following manner — when the current in the circuit including the capacitor 11, load 13, and the SCR 18 reverses direction, the SCR 22 is caused to conduct with the inductor 20 acting as a current balancing reactor with approximately half of the reverse current going through the inductor OA portion and the other current half going through the inductor OB portion and opposite in direction to the current flow in the portion OA. Stated otherwise, for the first portion of time, the current through the separate inductor portions OA and OB flows in opposite directions and the inductor 20 acts as a current balancing reactor. When the SCR 18 starts to block in the reverse direction, this current balancing action of the inductor 20 tends to keep the current equal in each half of the inductor and opposite in sense. As the SCR 18 starts to block fully, the voltage across the inductor 20 rises rapidly. When the current in the OB section of the inductor 20, minus the value of the current in the OA section of the inductor 20, is approximately equal to the current in the load 13, the inductor 20 ceases to act as a current balancing reactor and the voltage across the OB section of the inductor 20 will be positive (O positive relative to B) in the approximate ratio of the inductance of the OB portion of the inductor 20 (i.e., one-fourth the inductance 20) and the inductor 16. Stated otherwise, if there are 100 more volts on the capacitor 15 (and opposite in sense) than on the capacitor 11 and the ratio of the value of one-fourth of the inductance of inductor 20 to the inductance of inductor 16 is one to nine, the voltage across the OB portion of the inductance 20 will be approximately 10V and the reverse voltage across the SCR 18 will be approximately 21V, adding the drop of the SCR 22 and the auto-formed voltage across the AO section of the inductor 20, this increase in voltage over the approximately 1V, across the SCR 18 as provided in the prior art circuits increases the reverse voltage of the SCR 18 and makes the commutation action of the circuit much more reliable.

The second mode of commutation (i.e. the SCR 22 is caused to conduct when the SCR 18 starts to regain its forward blocking ability) works in the following manner: When the current through the load starts to reverse, this reverse current will flow through the SCR 18. As the SCR 18 starts to block current flow in the reverse direction the SCR 22 is caused to conduct. When the SCR 22 conducts, the reverse current flowing through the OA portion of the inductor 20 quickly reduces to zero and the voltage buildup in the inductor section OB begins. Once the current in the OB section of the inductor 20 is equal to the load current, the reverse voltage across the SCR 18 will be much higher than the 1V of previous devices in the same manner as for the first mode of commutation. That is, there will be a voltage across the OB portion of the inductor 20 that is proportional to the ratio of the inductive value of the inductor 16 and one-fourth the inductance of the inductor 20. Again, this increase in voltage across the SCR 18 makes the commutation of current much more reliable. It is obvious that the SCR 22 can be caused to conduct some time after the current has reversed direction but before the SCR 18 starts to regain its reverse blocking ability. In a less desirable manner the SCR 22 can also be caused to conduct before the current reverses direction. In fact the SCR 22 can also be replaced by a diode or a diode and resistor in series as will later be described.

At some time after the SCR 18 has regained its forward blocking ability, the SCR 19 is fired and the process is repeated (i.e. current flows and then reverses direction which causes a high reverse voltage across the SCR 19 in the same manner as just described for the SCR 18). One manner of controlling the level of power delivered to the load 13 is to control the interval between the time one SCR has regained its forward blocking ability and the opposite SCR is fired. The SCR 22 is commutated when the SCR 19 is caused to conduct.

Figure 3:
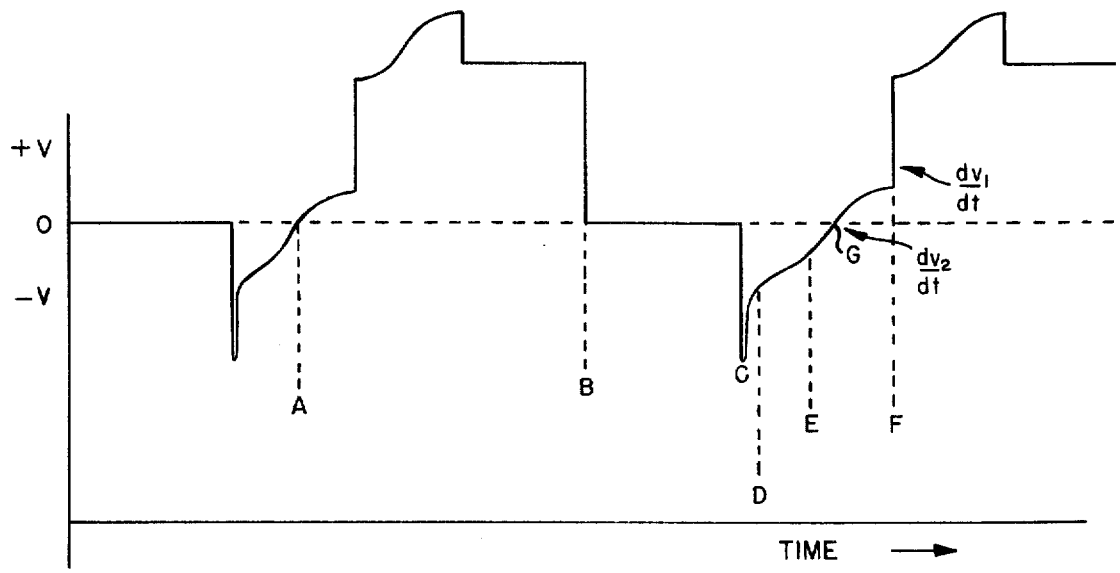
FIG. 3 shows a voltage waveform for the circuit of FIG. 2.

FIG. 3 illustrates a voltage waveform that results across the switching devices 18 and 19 of the inverter circuit 10, assuming the current in the load is continuous and either the SCR 22 or the SCR 21 are fired just after the current in the SCR 18 or the SCR 19 starts to reverse direction. The time AB is the time the switching device is blocking forward voltage. The time BC is the time the switching device is conducting. The time CD is the period during which the current balancing action of the inductor 20 is functioning and before the current in the section OB of the inductor 20 is approximately equal to the load 13 current. The time CE is the minimum amount of time the switching device can be reverse biased. At the time F the opposite switching device is fired, this time F can occur before the time G as previously described.

As can be seen in FIG. 3, the $dv/dt$ is the rate of rise of forward voltage on the switching device. Returning to FIG. 2, it can be readily seen that the RC filters can be small in value and still give a low $dv/dt$. The reason for this is that the inductor 20 has a rather large AC impedance for the time duration during which it is desired to control the $dv/dt$ on the switching device. Thus the value of the capacitors 23 and 25 can be much smaller than the capacitors in similar prior art circuits without such an inductor 20. Also the level of energy absorbed in the resistors 24 and 26 of the RC filters is not dependent upon the stray lead inductance and the value of the resistors in limiting the current in the capacitors of the RC filters. In FIG. 2 a relatively large inductance exists in the circuit to effectively limit the current in the capacitors (and therefore the $dv/dt$) and the RC filters. The voltage waveforms across the SCR 18 and the SCR 19 are similar for both modes of commutation (i.e. where the SCR 22 is fired just after the current reverses direction or at a time after SCR 18 has started to regain its reverse blocking ability).

As a primary advantage of the subject circuit, the inductor 20 in FIG. 2 is added to a commutation circuit that relies on current passing through an anti-parallel device, the $dv/dt$ and/or reverse voltage problems of the circuit are substantially reduced. This basic concept also functions with DC-to-DC choppers in which commutation is obtained by passing current through an anti-parallel diode. It will also function with a McMurray-type circuit like the General Electric Circuit disclosed in their SCR Manual, 5th Edition, pp 383–387, in which an auxiliary series resonant circuit is used to commutate the switching devices by forcing current through an anti-parallel diode.

The concepts shown in FIG. 2 increase the reverse voltage on the switching devices and easily hold the $dv/dt$ applied to the switching devices to a low value. By doing this, the chances of a circuit failure resulting in a crowbar condition are greatly reduced as compared to previously used circuits. To further safeguard against such miscommutations a low frequency, low-cost commutation circuit can also be added to the circuit of FIG. 2 to enable the circuit to recover from such a crowbar condition and continue to operate after the condition occurs as will now be explained.

Figure 4:
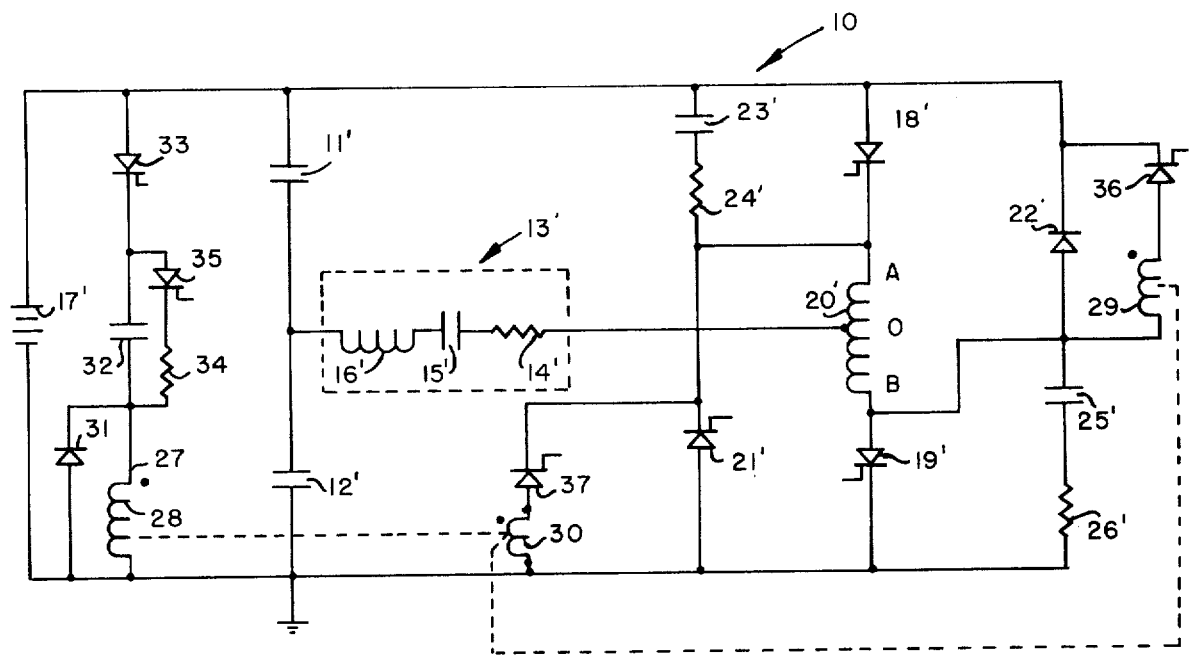
FIGS. 4 and 5 show other embodiments of the invention.

Shown in FIG. 4 is an inverter circuit 10' which is similar to that of FIG. 2 with the addition of several components. The components that are the same as those in FIG. 2 are labeled with the same number as in FIG. 2 but with a prime suffix (i.e. inductor 20 of FIG. 2 is labeled 20' in FIG. 4). Added components are labeled without a prime after the number. For instance, added to this inverter circuit is an auxiliary commutator that can be used primarily for commutation of the SCRs 18' and 19' under a crowbar condition (i.e. when SCRs 18' and 19' are both conducting at the same time). The auxiliary commutator does not include an anti-parallel type commutation.

In conjunction with the auxiliary commutator, the inductor 20' serves two functions. First, when the SCRs 18' and 19' are both conducting, the magnitude of common current through both SCRs is limited by the inductor 20'. As a second function, the inductor serves as a component across which the commutation voltage can be applied during the time interval that SCRs 18' and 19' are commutated simultaneously.

The auxiliary commutation circuit includes a transformer 27 having a primary winding 28 and two secondary windings 29 and 30. In series connection with the secondary winding 29 is an SCR 36 and in series connection with the secondary winding 30 is an SCR 37. The series circuit including the SCR 36 and the secondary winding 29 is in parallel connection with the anti-parallel SCR 22', and the SCR 37 and secondary windings 30 is in parallel connection with the anti-parallel SCR 21'. In parallel connection with the DC source 17' is a series circuit including the capacitor 32, the SCR 33 and the diode 31. In parallel connection with the diode 31 is the transformer primary winding 28. In parallel connection with the capacitor 32 is a series circuit including the resistor 34 and the SCR 35.

In operation, the capacitor 32 is at zero volts in the normal state. When the SCR 18' and/or 19' are to be commutated, the SCR 33, the SCR 36 and the SCR 37 are fired. The firing of the SCR 33 applies a DC voltage across the primary winding 28. The two secondary windings 29 and 30 have voltage induced therein of a magnitude, time and polarity necessary to commutate the SCR 18' and the SCR 19', respectively. During the commutation interval, the inductor 20' absorbs the excess voltage in the series circuit of ground, the secondary windings 30, the SCR 37, the inductor 20', the secondary winding 29, the SCR 36, the DC source 17' and back to ground. If there is load current flowing, the transformer will also carry the load current.

When the capacitor 32 is fully charged, the exciting current of the transformer will be clamped in the primary winding 28 through the diode 31. If there is load current at the end of the commutation interval and the SCRs 18' and 19' are not refired, the load 13' will continue to free wheel through the SCRs 21' and 22' until the current goes to zero. After the capacitor 32 is fully charged and the SCR 33 has regained its forward blocking ability, the SCR 35 then is fired to discharge the capacitor 32 back to its initial state of zero volts. After the current in the primary winding 28 which is clamped through the diode 31 goes to zero and the SCR 35 has regained its forward blocking ability, the SCR 33 can be fired again to commutate the SCR 18' and/or the SCR 19'.

It is believed to be obvious that different circuits can be used to induce the necessary voltage across the SCRs 21' and 22' for the purpose of auxiliary commutation. The voltages can be induced at the same time as just explained or induced at different times (i.e. commutate the SCR 18' without the commutation of the SCR 19'). It should be noted that the repetition rate of the auxiliary commutator can be sized for 1Hz/second operation or lower which maintains the cost of the circuit low.

The addition of the low cost inductor 20' helps simultaneously in many ways when using a commutation circuit that requires current through an anti-parallel device to commutate a switching device; for example, it:

1. Makes it possible to increase the reverse voltage across the switching devices during the commutation interval;
2. Makes it relatively simple and inexpensive to control the $dv/dt$ on the switching devices;
3. Lowers the wattage lost in the $dv/dt$ filters.
4. Limits any crowbar current to a level that can be commutated; and
5. Provides an element across which the auxiliary commutator can apply the commutating voltage.

The circuit of FIG. 2 also will function if the SCRs 21 and 22 are replaced with diodes. While the effective power factor is reduced, especially with high Q induction heating load circuits, the circuit will function in the manner previously described. The basic problem resulting from replacing the SCRs 21 and 22 with diodes is that energy becomes trapped in the inductor 20 (of FIG. 2, circuit 10). For example, when the SCR 18 is fired, the current will flow as previously described; but at some time after the current has reached its peak value but before the current reverses direction, current will start freewheeling around the loop of the SCR 18 and the inductor 20 and the diode replacing the SCR 22. This clamped or freewheeling current will inhibit the sweeping out of the SCR 18 and therefore increase the time period between when the load current is reversed and the SCR 19 can be caused to conduct. Stated otherwise, the load current will have to build up in the reverse direction to approximately twice the magnitude of the current freewheeling through the SCR 18, the inductor 20 and the diode that replaced the SCR 22 before the SCR 18 starts being swept out. This in effect lowers the power factor of the circuit.

A way to still use diodes in place of the SCRs 21 and 22 is to add resistors in series with the diodes that replace SCRs 21 and 22 of FIG. 2. As shown in FIG. 2, the diode 21C and the resistor 21D can be connected between the terminals 21A and 21B in place of the SCR 21 and the diode 22C and resistor 22D can be connected between the terminals 22A and 22B in place of the SCR 22. Thus the trapped energy will be absorbed in the resistors and thereafter the magnitude of the current freewheeling through the SCR 18, the inductor 20 and the diode that replaced the SCR 22 is lower when the current reverses direction. Therefore it takes less time for the current in the load to build up to the lower value of freewheeling current and this increases the effective power factor. The power losses in the resistor decrease the efficiency while permitting the replacing of an SCR with a diode and a resistor. Another way of reducing the freewheeling current is to keep the resistance of the center-tap inductor high (inductor 20 of FIG. 2) instead of adding resistance in series with the diodes that are put in place of the SCRs 21 and 22 of FIG. 2.

The concept thus far has been described in conjunction with a half bridge inverter. It will also function with a full bridge inverter, DC chopper circuits of the "McMurray" type and half and full bridge inverters of the "McMurray" type as previously referenced in the General Electric SCR Manual. In the "McMurray" type circuits the current source for commutation is an auxiliary series resonant circuit, but the concept is the same. Current is passed through an anti-parallel device (diode or SCR) interconnected with a tapped inductor to commutate the switching device, thereby maintaining the advantages as previously described.

It is also understood that the AO and OB portions of the inductor 20 of FIG. 2 can be non-coupled (i.e. two separate inductors) and inductors could be connected in series with the anti-parallel devices to enhance or increase the reverse voltage on the main switching devices (SCR's 18 and 19 of FIG. 2). Further the addition of inductors in series with the anti-parallel devices controls the $di/dt$ in the switching devices. Further, the inductor 20 can be made large enough so that when one of the switching devices is fired the opposite switching device is reverse biased by the autoformer action of the inductor 20 of FIG. 2. This effect would be especially useful where the load is defined and the inductor 20 can be designed for that load.

Another advantage of the circuit shown in FIG. 2 involves the audio noise in both the inverter itself and the load being much lower than in units being used today because the current is near sinusoidal in nature and not a square wave or non-linear in nature such as when saturable magnetics are used.

Figure 5:
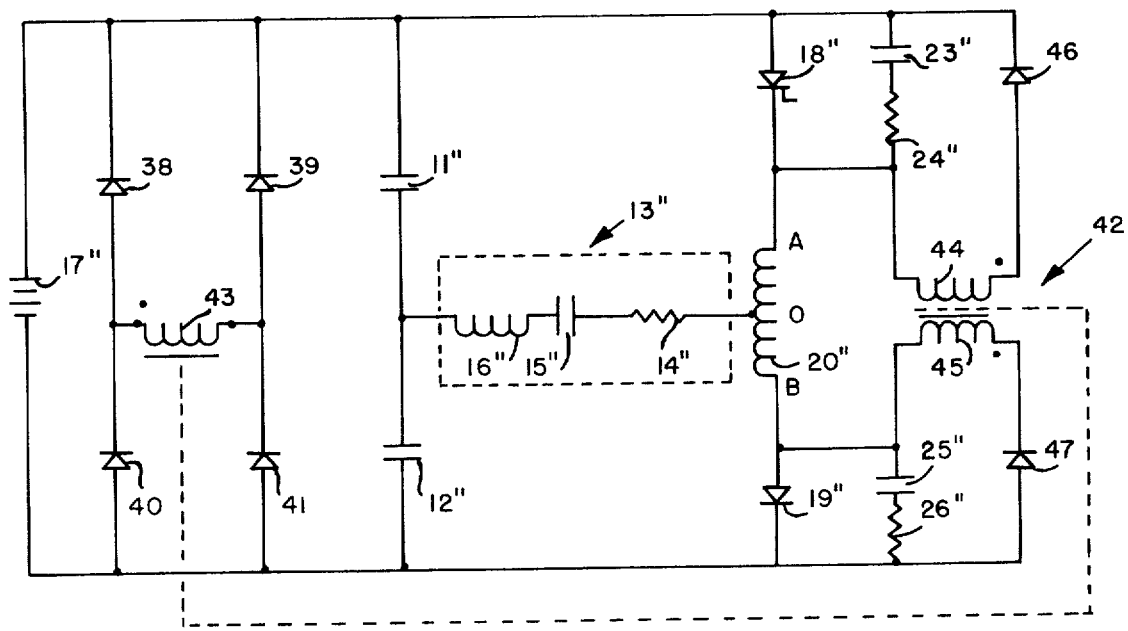

Once the combination of the higher reverse voltage on the switching devices, the effect of the inductor 20 on $dv/dt$ problems and limiting the shoot-through current are appreciated, numerous ways can be designed to obtain the same end. For instance, one such way is shown in FIG. 5. This circuit is more complex and expensive than that of FIG. 2 but it is still much less expensive than the methods that are being used and sold today. A number of modifications of FIG. 5 will be discussed in order to show that with an inductor such as the inductor 20 of FIG. 2, various modifications of the anti-parallel portions of the basic circuit of FIG. 2 will render a reverse voltage higher than one volt, the ability to limit the $dv/dt$ with low cost and low power-consuming filters and the ability to limit the crowbar current (which is much less likely to occur with low $dv/dt$ and higher reverse voltage) to a point that an auxiliary commutator can be used.

Shown in FIG. 5 is an inverter circuit 10" which is similar to that of FIG. 2 with the addition of several components to be described and with the interchanging of the anti-parallel SCRs with diodes. The components that are the same as those in FIG. 2 once again are labeled with the same number as in FIG. 2 with a double prime suffix.

The circuit of FIG. 5 obtains essentially the same results as that of FIG. 2 in a slightly different manner. As in FIG. 2 the current is sinusoidal in nature. When the current reverses direction, the SCR 18" sweeps out and starts to block in the reverse direction. At this time the current is shunted around the SCR 18" via the transformer 42. The current passes through one of the two primaries of the transformer 42 and in the case of a positive current (SCR 18" conducting) the current will pass through the primary winding 44. The voltage of the transformer primary winding 44 is clamped to a fixed voltage via the secondary winding 43 and the diodes 39 and 40. The turns ratio of the transformer 42 determines the reverse voltage on the SCR 18".

When the current has been reversed for a period of time long enough to turn off the SCR 18", the SCR 19" can be fired as previously described. The inductor 20" serves the additional function in FIG. 5 of not only allowing the $dv/dt$ filters to be small (as previously described) but also controlling the $di/dt$ of the SCR 19". The negative current operates in a manner similar to the positive cycle just described.

The transformer 42 can also be replaced with two chokes having closely coupled secondaries. The primary windings of the two chokes would replace the two primary windings 44 and 45 of the transformer 42 shown in FIG. 5. The secondary windings of the chokes are connected in series with diodes and connected in parallel with the DC source 17" in such a way that the primary of the choke is clamped when the reverse current flows. The turns ratio of the chokes can be the same as the turns ratio of the transformer 42 for the same reverse voltage. The choke core is reset when the opposite switching device (SCR 19" of FIG. 5) is fired. Under some load conditions the closely coupled secondary windings can be omitted and in such a configuration there is just one diode and one choke in series connection which are in turn connected in parallel with each switching device. Once again the chokes without secondaries are reset when the opposite SCR is fired (i.e. the choke in series with the diode 46 is reset when the SCR 19" is fired).

It should be noted that the end of the primary winding 44 (FIG. 5) connected to point A of inductor 20" can also be connected to point B with the corresponding end of the primary winding 45 connected to point B connected to point A. Further the two ends of primary windings 44 and 45 connected to points A and B respectively, can both be connected to point 0 of inductor 20".

Although preferred embodiments of the invention have been described, many modifications and changes within the spirit of the invention will occur to those skilled in the art and all such modifications are considered to fall within the scope of the following claims.

The invention claimed is:

1. A control system for regulating power input to a resonant electrical load from a dc source having first and second terminals, the combination comprising:
   a magnetic means connected between said first and second terminals to receive power from said source;
   a first switching device between the magnetic means and said first terminal and a second switching device between said magnetic means and said second terminal operable to commutate the flow of power from the respective terminal to the magnetic means when the switching device is interrupted;
   a first anti-parallel means connected across said first switching device and a second anti-parallel means connected across said second switching device; and
   a series resonant load connected with said magnetic means to receive power through the magnetic means from said dc source whereby by the selective commutation of said switching devices the power input to the load from the source can be regulated while said first and second anti-parallel means serve to provide a path for reverse current from the load around the respective switching device as the associated switching device is commutated.

2. A control for regulating power input to a resonant electrical load from a dc source having first and second terminals as recited in claim 1 wherein said first and second anti-parallel means each includes a third switching device which is caused to conduct in coordination with the commutation of said first and second switching devices.

3. A control for regulating power input to a resonant electrical load from a dc source having first and second terminals as recited in claim 1 wherein said first and second anti-parallel means includes a diode.

4. A control for regulating power input to a resonant electrical load from a dc source having first and second terminals as recited in claim 1 wherein said first and second anti-parallel means each includes a diode and resistor in series connection.

5. A control for regulating power input to a resonant electrical load from a dc source having first and second terminals as recited in claim 1 including first and second $dv/dt$ filters connected dynamically in parallel respectively with said first and second switching devices.

6. A control for regulating power input to a resonant electrical load from a dc source having first and second terminals as defined in claim 2 including first and second $dv/dt$ filters connected in parallel with said first and second switching devices respectively.

7. A control for regulating power input to a resonant electrical load from a dc source having first and second terminals as defined in claim 1 wherein said magnetic means comprises a center tapped inductor with the circuit means connecting the load to receive power through the magnetic means being connected between the inductor center tap and the dc source.

8. A control for regulating power input to a resonant electrical load from a dc source having first and second terminals as defined in claim 1 wherein said magnetic means comprises first, second and third inductors and said first and second anti-parallel devices are each connected in series with the first and second inductors respectively, and the third inductor is connected in series with the said first and second switching devices.

9. A control for regulating power input to a resonant electrical load from a dc source having first and second terminals as defined in claim 8 includes first and second $dv/dt$ filters connected in parallel with said first and second switching devices respectively.

10. A control for regulating power input to an electrical load from a dc source having first and second terminals, said control comprising,
    magnetic means connected across the terminals to receive power from the dc source;
    first and second switching means connected to interrupt the flow of power from the first and second terminals respectively, to the magnetic means;
    first and second circuit means connected in parallel with the first and second switching means for providing a reverse current flow path around the switching means when that switching means is interrupted, said first and second circuit means including voltage means for interacting with the reverse load current to establish a significant reverse voltage across the associated switching means; and
    circuit means for transmitting energy from the dc source and through the magnetic means to the load.

11. A circuit for commutating a switching device using anti-parallel type commutation, said circuit comprising:
    a switching device adapted to interrupt current flow from a dc source;
    a magnetic means connected in series with said switching device;
    an anti-parallel means connected in parallel with said switching device and said magnetic means;
    a series resonant means connected to receive current through the switching device and the magnetic means;
    commutation control means for causing an interaction between said series resonant means, said magnetic means and said anti-parallel means to establish a significant reverse voltage across the switching device during the commutation of said switching device.

12. A circuit for commutating a switching device using anti-parallel type commutation comprising:
    a switching device connected to a dc source;
    a magnetic means;
    an anti-parallel means connected in parallel with said switching device and said magnetic means;
    a series resonant means connected to said magnetic means; and
    commutation control means for causing interaction between said series resonant means, said magnetic means and said anti-parallel means to establish a significant reverse voltage across the said switching device during the commutation of said switching device.

13. A circuit as defined in claim 12 in combination with a $dv/dt$ filter connected in parallel with said switching device.

14. A circuit as defined in claim 13 wherein said anti-parallel means includes a second switching device.

15. A circuit as defined in claim 12 wherein said anti-parallel means includes a diode.

16. A control as defined in claim 10 wherein said load is of the series resonant type.

17. A control as defined in claim 16 wherein said series resonant load provides a reverse current when said first and second switching means interrupts the flow of power from the first and second terminals respectively and said first and second circuit means includes current conducting means operable to conduct said reverse load current around the switching means.

18. A control as defined in claim 17 wherein said load is an induction heating circuit.

19. A circuit as defined in claim 11 wherein said series resonant means generates a reverse current when said switching device interrupts current flow from the dc source and said anti-parallel means includes current conducting means for conducting the reverse load current around said switching device.

20. A circuit as defined in claim 19 wherein said series resonant means is an induction heating load.

21. A circuit as defined in claim 12 wherein said series resonant means is an induction heating load.

* * * * *